US007316841B1

(12) United States Patent
Hayashi et al.

(10) Patent No.: US 7,316,841 B1
(45) Date of Patent: Jan. 8, 2008

(54) ERASER

(75) Inventors: Shinichiro Hayashi, Yamatokoriyama (JP); Ryuzo Yamamoto, Yamatokoriyama (JP)

(73) Assignee: Sakura Color Products Corporation, Osaka-shi (JP)

( * ) Notice: Subject to any disclaimer, the term of this patent is extended or adjusted under 35 U.S.C. 154(b) by 0 days.

(21) Appl. No.: 09/645,646

(22) Filed: Aug. 24, 2000

(30) Foreign Application Priority Data

Aug. 30, 1999 (JP) ................................ 11-244134

(51) Int. Cl.
*B32B 5/28* (2006.01)
*B08B 7/00* (2006.01)

(52) U.S. Cl. .............................. 428/308.4; 428/319.3; 428/319.7; 428/319.9; 428/317.9; 428/316.6; 428/305.5; 428/315.5; 428/315.7; 15/3.53; 15/424; 134/6

(58) Field of Classification Search ............ 428/306.6, 428/308.4, 311.11, 311.31, 311.51, 319.3, 428/319.7, 319.9, 317.9, 305.5, 315.5, 315.7; 15/424, 425, 427, 3.53; 134/6
See application file for complete search history.

(56) References Cited

U.S. PATENT DOCUMENTS 2,487,903 A * 11/1949 Sturzenegger .............. 15/3.53
4,911,974 A * 3/1990 Shimizu et al. ............. 428/143
4,992,481 A * 2/1991 von Bonin et al. ........... 521/54
5,366,999 A * 11/1994 Giez et al. ..................... 521/54
5,413,853 A * 5/1995 Imashiro et al. ......... 428/308.4
5,716,997 A * 2/1998 Toyosawa et al. ............ 521/52

FOREIGN PATENT DOCUMENTS

| | | |
|---|---|---|
| JP | 56-28255 | 3/1981 |
| JP | 57-39999 | 3/1982 |
| JP | 8-258493 | 8/1996 |
| JP | 3041992 | 7/1997 |
| JP | 9-202097 | 8/1997 |
| JP | 10-211021 | 8/1998 |
| JP | 11-309991 | 11/1999 |

* cited by examiner

*Primary Examiner*—Hai Vo
(74) *Attorney, Agent, or Firm*—Hamre, Schumann, Mueller & Larson, PC.

(57) ABSTRACT

An eraser is constituted by an elastic material containing a rubber component or a resin component, and a skeleton structure for reinforcing the elastic material, and the skeleton structure is made from a porous structural material such as from an organic polymer that is broken when rubbed. Void portions in the porous structural material of the skeleton structure contain the elastic material of the eraser composition. Here, the skeleton portions of the skeleton structure may have an average thickness of 1 to 100 μm, and the void portions may have an average pore size of 10 μm to 3 mm. The eraser may have a surface hardness of 50 to 80, and also a sticking strength of 1.5 to 20 (kgf).

28 Claims, 7 Drawing Sheets

●: sticking strength of the eraser related to Example 1; ○: sticking strength of the eraser related to Comparative Example 1; ■: surface hardness of the eraser related to Example 1; and□: surface hardness of the eraser related to Comparative Example 1

ERASER

BACKGROUND OF THE INVENTION

The present invention relates to an eraser, and more particularly concerns an eraser which can be used with a light touch is less susceptible to cracking, is superior in its scrap-collecting property, and has an excellent erasing property.

An eraser (rubber eraser) for erasing handwriting written with a writing tool such as a pencil is composed of an elastic material of an eraser composition comprising rubber components or resin components such as rubbers, plastics and thermoplastic elastomers, and additive agents such as fillers and polishing materials.

In general, with respect to the performance required for an eraser, the erasing property and touch in use are listed; however, in recent years, the form of eraser scraps and its scrap-collecting property (combining property for eraser scraps) have become important factors. These properties mainly are determined by the hardness of the elastic material of an eraser composition constituting an eraser main body. In general, the softer the elastic material, the better the erasing property and the better the scrap-collecting property; in contrast, as the elastic material becomes softer, the touch in use becomes heavier, and it is susceptible to cracking due to repeated use and use with a high pressure. The hardness of the eraser main body can be controlled by adjusting factors such as the type, viscosity and molecular weight of rubber components and resin components, the type and compounded ratio of plasticizers and softeners and the type and compounded ratio of additive agents, such as polishing agents, etc., as well as adjusting manufacturing conditions. Thus, taking the above-mentioned trends into consideration, the manufacturers determine the hardness of an eraser by adjusting the composition and manufacturing conditions. Therefore, in the conventional erasers, it has not been possible to achieve the best states in all the properties including the erasing property, eraser-scrap-collecting property, touch in use, crack resistant property (rupture resistant property), etc., and the specifications are determined by taking into account the balance of those properties so as not to raise any problem in practical use.

Here, Japanese Unexamined Patent Publication No. 8-258493 proposes an eraser material composed of an eraser base material including a vinylchloride resin, a plasticizer and a filler, and a self-abrasion-type porous material. In accordance with this invention, it is possible to improve the strength without impairing the erasing property, and to provide an eraser with high toughness.

However, Japanese Unexamined Patent Publication No. 8-258493 defines that the self-abrasion-type porous material is a composite material consisting of layers made of binder layers that are continuous layers having a structure like a pencil core material and discontinuous layers composed of an inorganic constituent material, such as boron nitride, talc and mica, that does not contribute to adhesion to the interfaces. Therefore, this invention has a mechanism in which the inorganic constituent material, such as boron nitride, talc, and mica, combined by the binder is allowed to finely crumble like a pencil core due to friction, etc. against paper, and erases handwritings on the paper in combination with the eraser base material.

Therefore, since the eraser of Japanese Unexamined Patent Publication No. 8-258493 uses the porous material containing the inorganic constituent material, it has an extreme reduction in the elasticity as compared with conventional erasers, although it has improved strength as compared with conventional erasers; thus, the reduced elasticity impairs the erasing property that inherently should be exerted by the erasing base material. Moreover, the extreme reduction in the elasticity causes an unusual touch as compared with conventional erasers, failing to provide a good touch in use. Moreover, it is necessary for the eraser not only to be less susceptible to cracking at the time of erasing handwritings, but also to generate continuous eraser scraps in a collected manner after erasing; however, since the inorganic material different from the rubber base material is used as the porous material, it is difficult to generate sufficiently collected eraser scraps.

SUMMARY OF THE INVENTION

As a result of intensive studies for achieving the aforementioned objects, the inventors have found that when an elastic material of an eraser composition containing at least either a rubber component or a resin component is reinforced by a skeleton structure from which skeleton portions on the surface of an eraser are separated when rubbed, it is possible to obtain an eraser which is superior in the scrap-collecting property and erasing property, has a good touch in use, and is less susceptible to cracking with high toughness. The present invention relates to an eraser which is provided with an elastic material of an eraser composition containing at least either a rubber component or a resin component, and a skeleton structure containing the elastic material, from which skeleton portions on the abrasion surface of the elastic material are disconnected and separated together with the abrasion of the elastic material when rubbed.

In one preferred embodiment of the present invention, the skeleton structure is constituted by a porous structural material, in particular, such as a porous structural material of an organic polymer, that is broken when rubbed, and this skeleton structure and an elastic material made of a conventionally known eraser composition are combined to form an eraser; thus, it is possible to obtain an eraser which is superior in the scrap-collecting property and erasing property, has a good touch in use, and is less susceptible to cracking with high toughness.

In another preferred embodiment of the present invention, the eraser is composed of a porous structural material that is broken when rubbed. In still another preferred embodiment of the present invention, the eraser has a composition in which the porous structural material of the skeleton structure is composed of an organic polymer.

In other preferred embodiment of the present invention, the said skeleton has a continuous structure.

Therefore, the eraser in the preferred embodiment of the present invention is allowed to receive a load applied at the time of erasing with its entire composite body, i.e, between its elastic material of an eraser composition and the skeleton structure that regulates an extreme elastic deformation of the elastic material, that is, in particular, a porous structural material such as an organic polymer. Therefore, the eraser of the present invention has a high strength, and is superior in the rupture resistant property with high toughness. For this reason, the eraser is less susceptible to cracking even in the case of repeated use and use with a high load. Thus, in the eraser of the present invention, even if the elastic material of the eraser composition is made softer with less hardness than the elastic material of a conventional eraser composition, the strength of the eraser as a whole still is improved, the superior elasticity thereof still is maintained higher, and the rupture resistant property thereof is still superior, and the eraser is consequently less susceptible to cracking during use. In other words, in the present invention, the eraser is allowed to have a high hardness and a low sticking strength so that it becomes superior in the strength and elasticity.

Moreover, the above-mentioned skeleton structure, that is, especially, the porous structural material, in particular, the porous structural material of an organic polymer, regulates the excessive elastic deformation in the elastic material of the eraser composition so that the eraser as a whole is provided with high elasticity; however, it does not give adverse effects on the viscoelasticity that the eraser composition inherently possesses, thereby allowing the elastic material of the eraser composition to exert its inherent viscoelasticity. Therefore, even if the elastic material of the eraser composition is made softer with less hardness than the elastic material of a conventional eraser composition, the strength of the eraser as a whole still is improved, the superior elasticity thereof still is maintained higher, and it is possible to improve the scrap-collecting property because of the softness of the elastic material that is the eraser composition. In other words, the eraser scraps generated by the eraser of the present invention are continuous, and formed in a collected manner; this makes it possible easily to dispose of the eraser scraps, and is preferable from the viewpoint of deposition of eraser scraps.

Moreover, as compared with conventional erasers, the eraser of the present invention can be used with a very light touch at the time of erasing, and is superior in the touch in use. This is probably because, when the skeleton structure, that is, in particular, the porous structural material of an organic polymer, is exposed to the surface of the eraser together with the elastic material of the eraser composition, the skeleton structure, that is, in particular, the porous structural material of an organic polymer reduces friction against the surface of paper, while the elastic material of the eraser composition is allowed to exert its inherent erasing property, so that it is possible to reduce a load imposed on the user of the eraser. Moreover, since the eraser has a low sticking strength, it requires less force to cause abrasion (that is, a force required at the time of erasing), thereby providing a light touch at the time of erasing and the subsequent good touch in use. Furthermore, since the porous structural material is used as the skeleton structure, the superior strength and elasticity prevents the eraser from being bent unnecessarily during use, thereby providing a smooth erasing process with a light touch. Therefore, the arrangement in which the elastic material of the eraser composition is made softer with less hardness as compared with the elastic material of the conventional eraser composition makes it possible to provide a smooth, light tough at the time of erasing.

Moreover, since the elastic material of the eraser composition is made softer than the elastic material of the conventional eraser composition, it is possible to provide a superior erasing property. Here, the skeleton structure, that is, in particular, the porous structural material of an organic polymer, as it is, is allowed to exert an erasing performance, thereby making it possible further to improve the erasing property.

In the case when the elastic material of the eraser composition is made softer with less hardness as compared with the conventional eraser, the abrasion of the elastic material of the eraser composition is accelerated as compared with the conventional eraser, with the result that it is possible to reduce the possibility in which carbon from a pencil, etc. adhering to paper is stuck to the eraser main body and darkens the eraser.

In the case of the above-mentioned skeleton structure, that is, in particular, the porous structural material of an organic polymer, at the time of a rubbing process with the eraser, a deformation applied onto the elastic material of the eraser composition, as it is, is exerted as a force for separating the skeleton portions on the eraser surface of the skeleton structure, that is, a force for breaking the skeleton portions, particularly, in the case of the porous structural material. Consequently, the eraser of the present invention exerts its erasing property with the elastic material of the eraser composition being worn, while the skeleton portions being separated or broken, and the eraser scraps of the eraser composition are separated and collected while taking fragments of the broken and isolated skeleton portions. For this reason, the eraser scraps, which include the fragments of the skeleton portions of the skeleton structure and the elastic material of the eraser composition that have been collected, are generated, and no eraser scraps consisting of only the skeleton portions are generated. Moreover, in the eraser of the present invention, during the erasing process, the abrasion face of the elastic material and the separating face of the skeleton structure (the breaking face of the porous structural material) are made coincident with each other, or made virtually coincident with each other; thus, after the skeleton portions of the porous structural material have been separated or broken, and come off, any separated pieces (broken pieces) of the skeleton portions of the porous structural material remaining in the eraser main body hardly are allowed to rise from the surface of the eraser or to form holes after having been pulled out.

As compared with the conventional eraser, the eraser of the present invention generates eraser scraps in a collected manner without being scattered; thus, it has excellent functions and effects in which the eraser is superior in the scrap-collecting property, provides a smooth erasing process, and has a good touch in use. Moreover, since the eraser itself has a proper strength, it is less susceptible to damages, and has a good rupture resistant property. It also has a good erasing property.

In the preferred embodiment in which the porous structural material is used as the skeleton structure, the structural material preferably contains the cross sectional shape with virtually polygonal or virtually circular cells, and in particular, the porous structural material is most preferably provided as a foamed structural material.

Moreover, in a still another preferred embodiment of the present invention, the porous structural material is a mesh structural material, and most preferably, the porous structural material is a three-dimensional mesh structural material.

The objective of the present invention is to provide an eraser which has a sufficient strength, is less susceptible to cracking with high toughness, is superior in its scrap-collecting property, has an excellent erasing property, and can be used with a good touch.

DESCRIPTION OF THE PREFERRED EMBODIMENT

Figure 1:
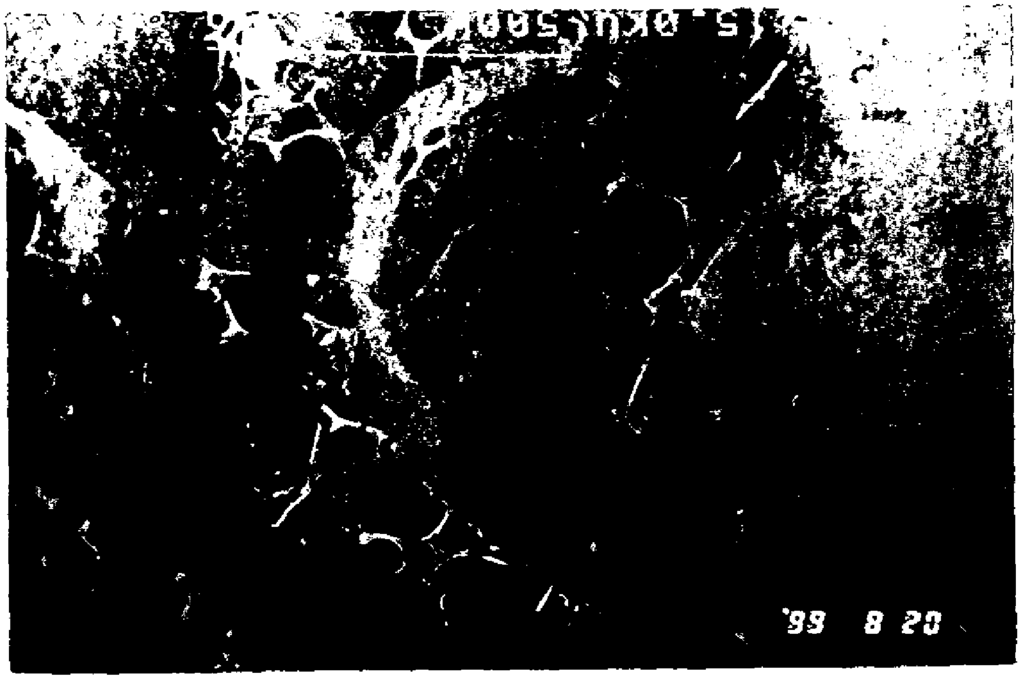
FIG. 1 is an electron-micrograph showing the surface of an eraser of one embodiment of the present invention that is enlarged 80 times.
Figure 2:
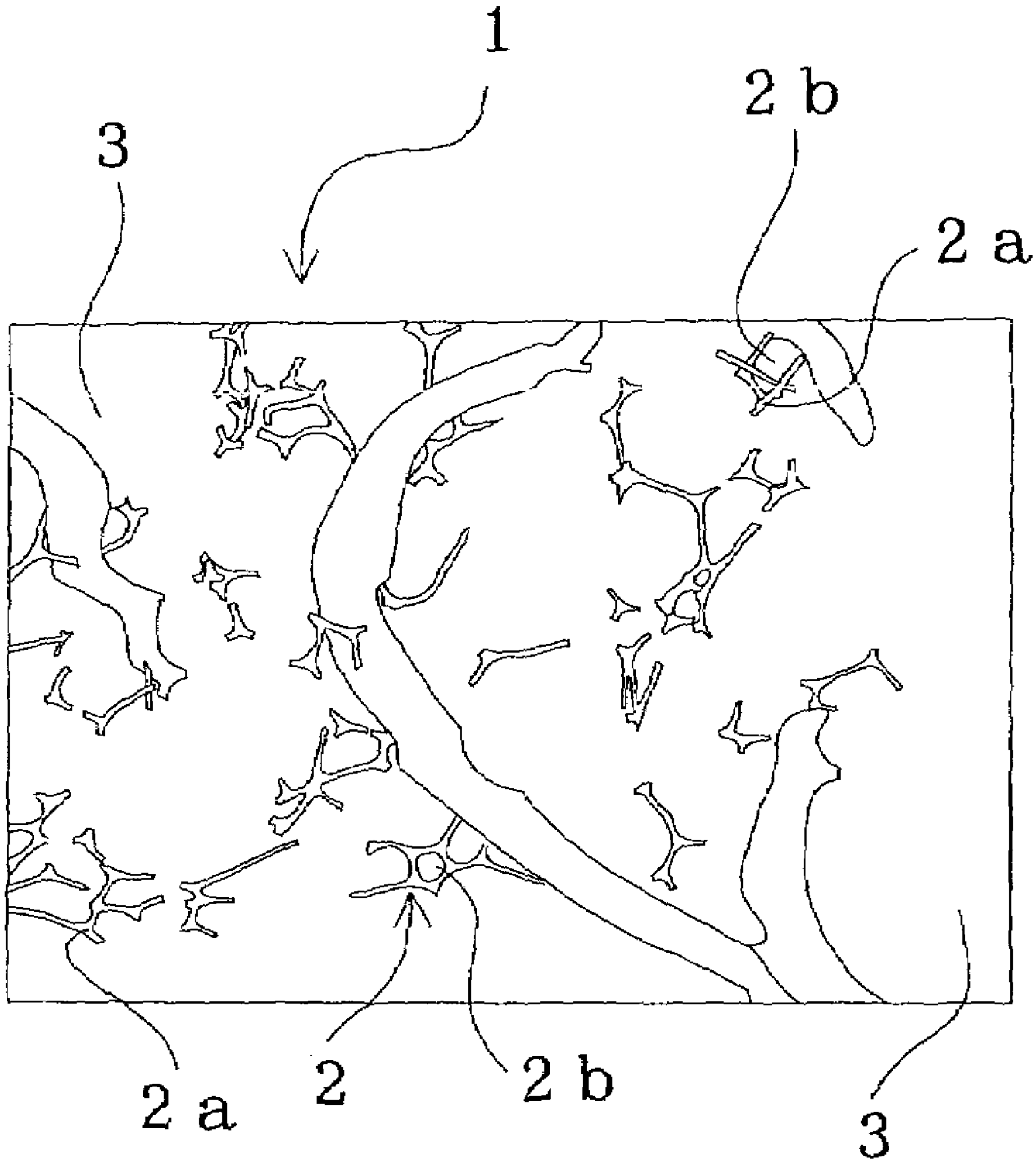
FIG. 2 is a schematic drawing in which the micrograph of FIG. 1 is re-drawn for convenience of explanation.
Figure 3:
FIG. 3 is an electron-micrograph showing the surface of a skeleton structure constituting the eraser of FIG. 1 that is enlarged 200 times.
Figure 4:
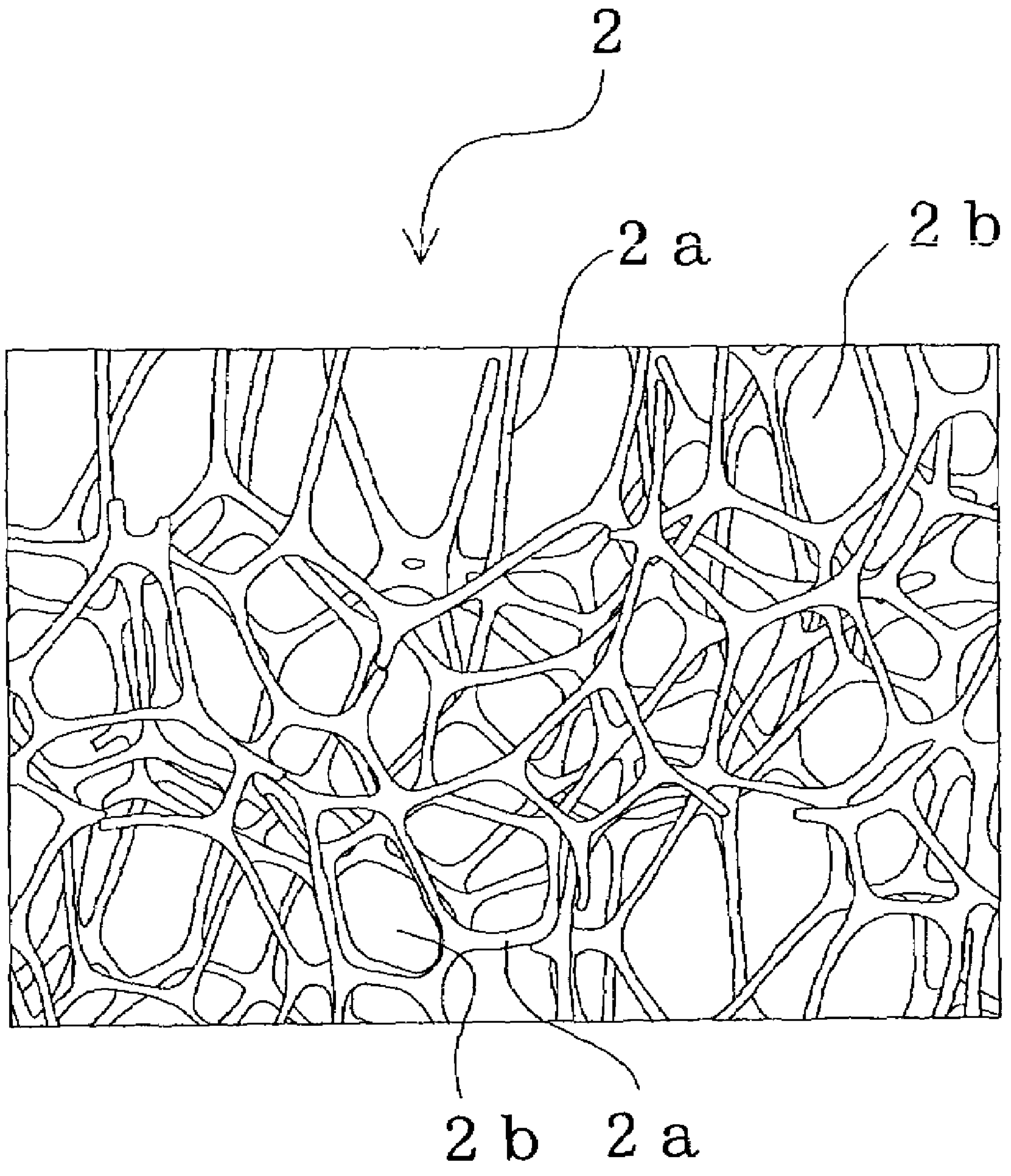
FIG. 4 is a schematic drawing in which the micrograph of FIG. 3 is re-drawn for convenience of explanation.
Figure 5:
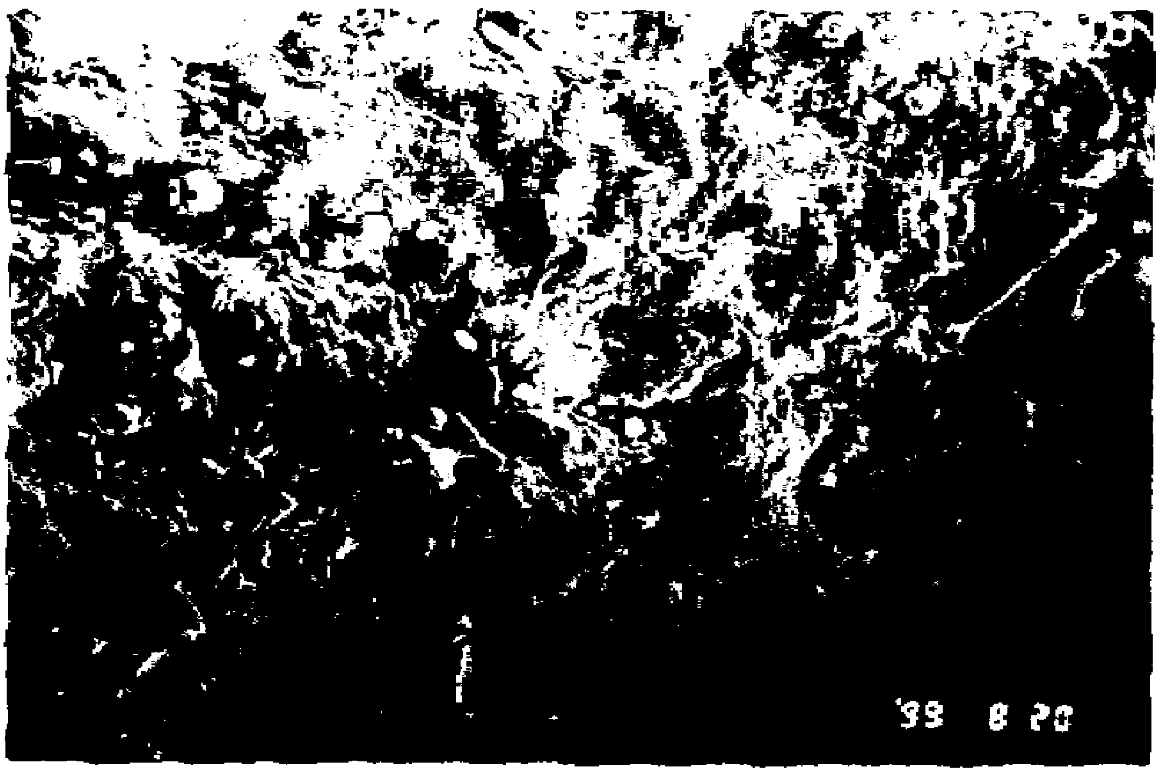
FIG. 5 is an electron-micrograph showing the surface of an eraser scrap of the eraser of FIG. 1 that is enlarged 200 times.
Figure 6:
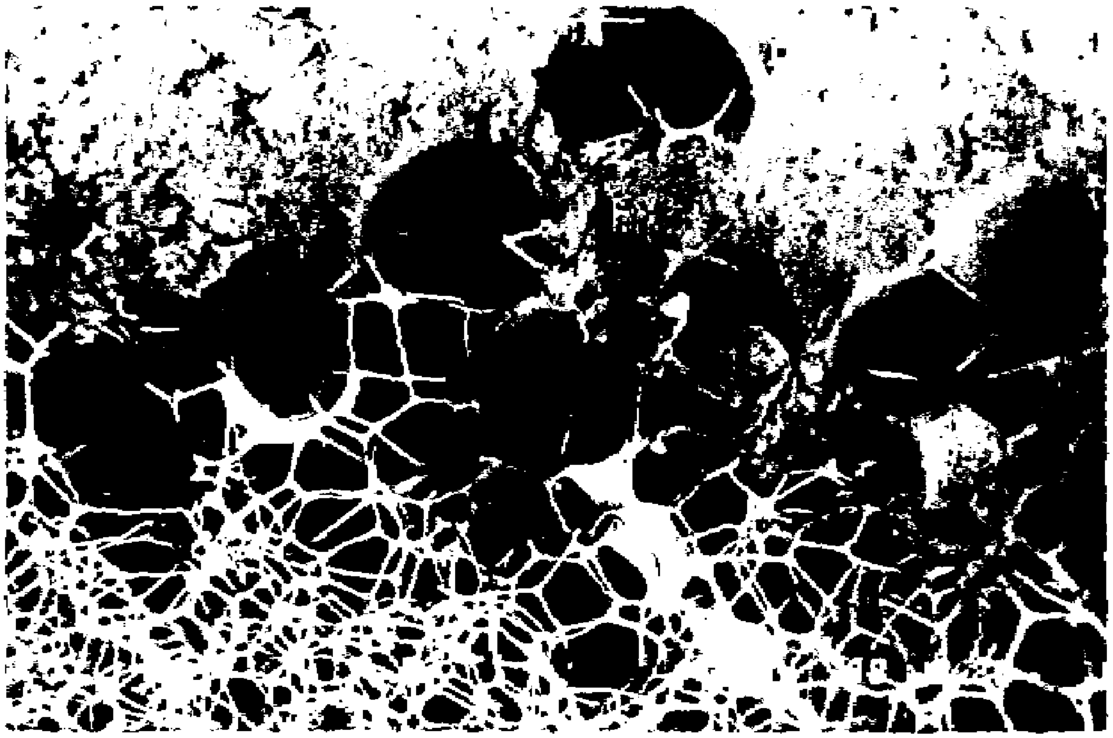
FIG. 6 is an electron-micrograph showing the surface of an eraser of another embodiment of the present invention that is enlarged 60 times.

Referring to The Figures, the following description will discuss embodiments of the present invention. As described above, FIG. 1 is an electron-micrograph showing the surface of an eraser of one embodiment of the present invention that is enlarged 80 times. FIG. 2 is a schematic drawing in which the micrograph of FIG. 1 is re-drawn with lead lines and reference numbers for convenience of explanation. FIG. 3 is an electron-micrograph showing the surface of a skeleton structure constituting the eraser of FIG. 1 that is enlarged 200 times. FIG. 4 is a schematic drawing in which the micrograph of FIG. 3 is re-drawn with lead lines and reference numbers for convenience of explanation. FIG. 5 is an electron-micrograph showing the surface of an eraser scrap of the eraser of FIG. 1 that is enlarged 200 times. FIG. 6 is an electron-micrograph showing the surface of an eraser of another embodiment of the present invention that is enlarged 60 times. Here, the electron-micrographs of the present invention were taken by using "ERA-8000" (made by ELIONIX INC.).

As illustrated in FIG. 1 and FIG. 2, an eraser 1 is composed of a porous structural material that is a skeleton structure 2. Here, this skeleton structure 2 is composed of a porous structural material of an organic polymer but can be composed of other substances than organic polymer. Further, the skeleton structure 2 contains an elastic material 3 of an eraser composition containing a rubber component or a resin component. Here, in one embodiment of the skeleton structure of the present embodiment, a skeleton portion 2*a*, which has a greater stiffness as compared with the elastic material 3 of the eraser composition, is composed of a foamed structural material serving as a structural material having virtually polygonal or virtually circular cells when viewed in cross section. Reference number 2*b* represents a void portion of the skeleton structure surrounded by the skeleton portion 2*a*.

As described above, in the eraser of the present embodiment, the void portion 2*b* of the skeleton structure 2 contains the elastic material 3 of the eraser composition containing the rubber component or the resin component, as illustrated in FIG. 3 and FIG. 4. Therefore, since the elastic member 3 of the eraser composition contains the rubber component or the resin component, and since the skeleton structure 2 is the porous structural material of an organic polymer, the void portion 2*b* of the skeleton structure 2 is filled with the elastic material 3 of the eraser composition containing the rubber component or the resin component.

The skeleton structure 2 serves as the skeleton structure so as to reinforce the elastic material 3, and allows its skeleton portion 2*a* to be broken when rubbed. In other words, with respect to the skeleton structure 2, the porous structural material, which allows the skeleton portion 2*a* to be broken when rubbed while reinforcing the elastic material 3, is adopted.

With respect to the skeleton structure 2 of the porous structural material, although not particularly limited, the average thickness of the skeleton portion 2*a* can be set to, for example, 1 to 100 μm (and more preferably, 10 to 50 μm). Moreover, although not particularly limited, the average pore diameter of the void portion 2*b* of the skeleton structure 2 can be set to, for example, 10 μm to 3 mm (and more preferably, 20 μm to 1 mm).

Moreover, with respect to the skeleton structure 2 of the porous structural material, although not particularly limited, the void rate (pore rate) is set to, for example, not less than 60%, preferably, not less than 80%, and more preferably, not less than 90% (for example, 90 to 99.8%). In particular, when the pore rate is set to not less than 90%, the thickness of the skeleton portion becomes smaller, making the porous structural material susceptible to breaking when rubbed, as well as making the abrasion face of the elastic material and the separating face of the skeleton structure coincident with each other, or virtually coincident with each other.

Moreover, in the skeleton structure of the porous structural material, the filling rate of the elastic material of the eraser composition with respect to the entire volume of the void portions in the porous structural material is not particularly limited. However, the filling rate is preferably set in the range from not less than 50% to less than 100%. This is because, when the filling rate is less than 50%, there is degradation in the eraser-scrap-collecting property, the erasing property, and the touch in use. When the eraser has the filling rate of 100%, the eraser still has a sufficient strength, is less susceptible to cracking with high toughness, is superior in its scrap-collecting property, has an excellent erasing property, and can be used with a good touch, as compared with the conventional eraser; however, by setting the filling rate to less than 100%, more preferably 80 to 60%, and most preferably, 70%, it is possible to increase the abrasion rate of the surface of the eraser at the time of erasing, and consequently to increase the erasing rate.

Here, with respect to erasers in which the filling rates of the elastic material of the eraser composition with respect to the skeleton structure were set respectively to 100% and 70% (in which the other conditions were the same), the erasing rate (%) and the abrasion rate (%) were respectively measured. The results showed that in the case of the filling rate of 100%, the erasing rate (%) and the abrasion rate (%) of the eraser were 97.6% and 11.4% respectively, and that in the case of the filling rate of 70%, the respective percentages were 98.8% and 16.3% that showed improved erasing rate and abrasion rate. Here, the erasing rate and the abrasion rate were measured under the following conditions: The erasing rate was measured in accordance with JIS S 6050. The abrasion rate was measured by the following method. First, samples were processed into a column shape having a diameter of 12±1 mm (11 to 13 mm) and a thickness of 10±1 mm (9 to 11 mm), and the weight of this was measured. Then, this was attached to an erasing tester described in JIS S6050 (however, in the erasing rate of JIS S6050, since the thickness is 5 mm, the holder section was modified so as to accept the sample of 12 mm). Against test paper as described in JIS S6050, this was rubbed with reciprocation 50 times with a load of 500 g. Next, eraser scraps generated by the rubbing process were removed, and the weight of the sample was measured. The amount of reduction due to the rubbing process was calculated as a percentage with respect to the weight before the rubbing process.

Moreover, the porous structural material of the skeleton structure is preferably set to have a tensile strength of not more than 3 $kgf/cm^2$, and more preferably, not more than 2 $kgf/cm^2$. The eraser having a porous structural material having a tensile strength exceeding 3 $kgf/cm^2$ as its skeleton structure makes its skeleton portion difficult to be separated or broken together with the abrasion of the elastic material of the eraser composition at the time of erasing. The value of the tensile strength was measured in accordance with JIS K 6402. Here, the thickness of the sample was 10 mm, the dumbbell had #2 shape, and the tensile speed was 300 mm/min.

Moreover, the porous structural material is preferably set to have an extension of not more than 500%, and more preferably, not more than 100%. The porous structural material having an extension exceeding 500% fails to make the abrasion face of the elastic material and the separating face of the skeleton structure coincident with each other during the erasing process, allowing the porous structural material of the skeleton structure to rise from the abrasion face, and giving adverse effects on the external appearance. The value of the extension also was measured in accordance with JIS K 6402. Here, the thickness of the sample was 10 mm, the dumbbell had #2 shape, and the tensile speed was 300 mm/min.

Moreover, the porous structural material preferably is set to have a compression repulsive force of not less than 0.2 kgf, and more preferably, not less than 0.7 kgf. The compression repulsive force of less than 0.2 kgf causes an insufficient stiffness in the eraser as a whole, resulting in difficulty in providing high elasticity. The compression repulsive force was provided as a value that was measured by pressing a disk having a diameter of 15.2 mm onto a sample having a thickness of 10 mm and compressing the sample by 5 mm at a rate of 7 mm/min.

From these, the preferable porous structural material in this embodiment is an eraser having a tensile strength not more than 3 $kgf/cm^2$, an extension of not more than 500%, and a compression repulsive force of not less than 0.2 kgf.

With respect to the organic polymer of the skeleton structure 2 of the present embodiment, a melamine-based resin was used. Moreover, the elastic material 3 was formed by an eraser composition containing a vinylchloride-based resin and a plasticizer.

The eraser of the present invention, which is formed as described above, has a sufficient strength and elasticity, is superior in the rupture resistant property, is superior in its scrap-collecting property (see FIG. 5), has an excellent erasing property, and can be used with a good touch, as compared with the conventional eraser.

Here, the eraser of the present invention is not limited by the above-mentioned embodiment. With respect to the porous structural material, which is not particularly limited, any material may be used as long as it has a skeleton structure having a skeleton portion and void portions. With respect to such a porous structural material, for example, a structural material having virtually polygonal or virtually circular cells as shown in FIGS. 1 through 4, or a mesh structural material may be used. Here, the skeleton portion preferably is set to form a skeleton structure having a sufficient hardness in a solid state; however, any material may be used as long as it has a skeleton structure that can reinforce the elastic material. For example, the porous structural material may be fused by heat, have its pore shape deformed upon dissolving (being compatible with) with the component in the eraser composition, become thinner in the skeleton, or form a semi-compatible state with the eraser composition.

In the present invention, the shape of the skeleton portion and the shape of the void portions are not particularly limited. As described above, the skeleton structure may be any structure that serves as the skeleton structure so as to reinforce the elastic material and also allows the skeleton portion to be broken when rubbed. In any case, any material that can restrict the deformation of the elastic material of the eraser composition contained in the void portions of the porous structural material two-dimensionally or three-dimensionally, and reduce the deformation to a predetermined limitation may be suitable.

The structural material containing virtually polygonal or virtually circular cells is not particularly limited, and any structural material may be used as long as it contains cells having a virtually polygonal shape or a virtually circular shape; and for example, a structural material having virtually circular cells such as a foamed structural material (sponge shaped structural material), or a structural material having virtually polygonal cells such as a honeycomb structural material, may be used. Here, the foamed structural material is preferably used. In the case of the foamed structural material, the pore rate of less than 90% allows its pores to have a spherical or virtually spherical shape; however, the pore rate of not less than 90% allows its pores to form a shape like a three-dimensional mesh structure.

In the structural material (in particular, foamed structural material) containing virtually polygonal or circular cells, the state of pores is not particularly limited, and any of communicated pores or independent pores may be used, and communicated pores (open cells) and independent pores (closed cells) may be mixed with each other. However, taking it into consideration that the porous structural material of the skeleton material is filled with the elastic material of the eraser composition, communicated pores are more preferable. Here, with respect to the communicated pores, virtually any communicated pores may be used, and in the present invention, those having a rate of communicated pores of not less than 90% (that is, the rate of independent pores is less than 10%) with respect to all the pores are considered to be communicated pores.

Moreover, with respect to the mesh structural material, a planar mesh structural material (that is, a two-dimensional mesh structural material) may be used; however, a stereoscopic mesh structural material (that is, a three-dimensional mesh structural material) more preferably is used. The stereoscopic mesh structural material makes it possible to improve the strength and viscoelasticity of the eraser.

Here, in the present invention, the porous structural material of the skeleton structure and the elastic material of the eraser composition may be integrated into a composite material. When the skeleton structure and the elastic material are integrated into the composite material, it is possible to provide higher toughness, to increase the elasticity and thus improve the rupture resistant property, and to smooth the surface of the eraser after use, thereby making the abrasion face of the elastic material and the separating face of the skeleton structure coincident with each other. Of course, it becomes possible to improve the touch in use, the eraser-scrap-collecting property and the erasing property.

The skeleton structure of the present invention is not particularly limited; however, it is important for the skeleton structure to contain the elastic material of the eraser composition and to allow its skeleton portion on the abrasion surface of the elastic material to be separated and broken together with the abrasion of the elastic material of the eraser composition at the time of erasing. From this point of view, the skeleton structure preferably is formed by the porous structural material. The porous structural material is not particularly limited, any porous structural material may be used as long as it contains the elastic material of the eraser composition and allows its skeleton portion on the abrasion surface of the elastic material to be separated and broken together with the abrasion of the elastic material of the eraser composition at the time of erasing. For example, a porous structural material composed by an organic polymer or an inorganic polymer may be used. With respect to the organic polymer, it can be used either alone or in combinations of two or more of them. Examples of the organic polymers include resins (for example, thermosetting resins, thermoplastic resins, etc.) rubbers, fibers, etc. Of course in the case of the structural material having a porous structural material with virtually polygonal or virtually circular cells, resins and rubbers are used, and in the case of the mesh structural material, fibers are used.

Examples of the resin include various resins including thermosetting resins such as melamine resins, epoxy resins, urethane resins, urea resins and phenolic resins, and thermoplastic resins, such as styrene-based resins including polystyrene, ester-based resins including polyester, acrylic resins including polyacrylate, olefin resins including polyethylene and vinylchrolide-based resins including polyvinylchloride, and elastomers. Examples of rubbers include natural rubbers, styrene-butadiene rubber, nitrile-butadiene rubber, etc. Moreover, natural high-molecular porous materials such as sponge may also be used. Examples of fibers include natural fibers such as cotton, silk and hemp, and synthetic fibers such as cellulose fibers, ester-based fibers, acrylic fibers, and amide-based fibers.

In particular, in the structural material containing the cross sectional shape with virtually polygonal or virtually circular cells, when a melamine-based resin is used as the organic polymer, it is possible to form a foamed structural material or a stereoscopic mesh structural material having a thin thickness of the skeleton portion, a small pore size of void portions and a high pore rate. For this reason, the structure is easily broken when rubbed, and it is possible to avoid broken fragments of the skeleton portion from appearing on the surface of the eraser main body like whiskers after use and also to make the abrasion face of the elastic material and the separating face of the porous structural material coincident with each other, or virtually coincident with each other. Of course, even in the case when a material other than a melamine-based resin is used as the organic polymer, by controlling the thickness of the skeleton portion, the pore diameter of the void portions and the pore rate, it is possible to provide a structure that is easily broken when rubbed, and allows the abrasion face of the elastic material and the separating face of the porous structural material coincident with each other, or virtually coincident with each other on the surface of the eraser after use.

The elastic material of the eraser composition is not particularly limited, and a composition, which is impregnated and absorbed into the porous structural material of the skeleton structure, preferably may be used. More specifically, conventionally known compositions such as plastic-based, rubber-based or elastomer-based compositions, used as the eraser base material, may be adopted.

With respect to the plastic-based eraser composition, for example, various resins, such as thermoplastic resins, thermosetting resins, UV setting resins, electron-beam setting resins, multi-liquid setting resins (two-liquid setting resins, etc.), catalyst setting resins and fiber element ester, may be used. Among these resins, thermoplastic resins are more preferably used. These resins may be applied in various states, such as a dissolved state in a solvent, a dispersed state in a solvent or an emulsified state.

More specifically, vinylchloride-based resins such as polyvinyl chloride, vinylchloride-vinylacetate-based resins and vinylchloride-ethylene-vinylacetate-based resins, and vinylacetate-based resins such as ethylene-vinylacetate resins may be used. In particular, a sol-state composition between the vinylchloride-based resin and a plasticizer is most preferably used as the base material. This is because the sol-state composition between the vinylchloride-based resin and a plasticizer has a sufficient fluidity upon being impregnated and absorbed into the porous structural material of the skeleton structure, and because this is easily cured in the void portions in the porous structural material of the skeleton structure.

With respect to the plasticizer, any known plasticizer may be used as long as it can plasticize the contained thermoplastic resin, that is, in particular, polyvinyl chloride. With respect to the plasticizer, phthalic plasticizers, such as dioctylphthalate and diheptylphthalate, are preferably used.

Besides these, the following additive agents may be used: an abrasive material, a filler such as calcium carbonate, magnesium carbonate, silica, talc, clay, diatomaceous earth, quartz powder, alumina, alumina silicate and mica, metal soap, a barium-zinc-based stabilizer, calcium-zinc-based and magnesium-zinc-based stabilizers, a colorant, perfume, a surfactant, glycols, etc. With respect to the colorant, known pigments, such as organic pigments, inorganic pigments and fluorescent pigments, and known dyes may be used.

With respect to the plastic-based eraser composition, the rate of the resin (in particular, vinylchloride resin) is not particularly limited; and for example, the rate is set to 10 to 80% by weight, and more preferably, 20 to 70% by weight, with respect to the entire eraser composition. The rate of the plasticizer is set to, for example, 10 to 80% by weight, and more preferably, 20 to 70% by weight, with respect to the entire eraser composition. Moreover, the rate of the filler is set to, for example, 0 to 70% by weight, and more preferably, 5 to 40% by weight.

The composition of the rubber-based eraser may include, for example, a rubber component, a factice, a softener, sulfur, a vulcanizing accelerator, a filler, an anti-aging agent, a colorant, and perfume. The composition of the elastomer-based eraser may include, for example, a thermoplastic elastomer, a softener, a filler, a stabilizer, a colorant and perfume.

Moreover, in the present invention, a color-changing pigment component (pressure-sensitive color-changing pigment component) contained in a pressure-sensitive microcapsule that is ruptured by frictional force, or a color-changing pigment component (heat-sensitive color-changing pigment component) that changes colors by frictional heat, may be used.

Additionally, in the eraser of the present invention, an arrangement may be adopted in which at least either of the porous structural material and the elastic material of the eraser composition is colored. In particular, in the case when the porous structural material and the elastic material of the eraser composition are colored in respectively different colors, not only the eraser main body, but also the eraser scraps have a mixed color so that it is possible to provide an interesting color appearance, and it is also possible to allow the user to observe and recognize the fact that the eraser is formed such that the skeleton structure is taken into the eraser scraps as desired, through its physical properties.

Furthermore, the skeleton structure may be constituted by a plurality of blocks of porous structural materials. For example, these block-shaped porous structural materials have at least any of the shapes of spherical, rectangular and plate shapes. In particular, in the case when an eraser is formed by using a plurality of blocks of porous structural materials as the skeleton structure, since each block is independent, a joint between the blocks serves as a bending portion at which the eraser can be bent along this joint, if necessary. Conventionally, upon using an eraser, in order to get a better erasing process, the user sometimes has cut the eraser with a knife, etc. to produce new corners; however, the present invention eliminates this task, and provides convenient usage in which a joint between the above-mentioned blocks can be bent and cut simply with the hands so as to produce new corners, or to provide, for example, a small piece of the eraser, if necessary. Here, in the case of the eraser having the block-type skeleton structure, in order to provide easy bending at a joint between the blocks, the components in the eraser composition may be adjusted, the degree of polymerization of the synthetic resin may be adjusted, or the gellation temperature may be adjusted. These methods may be adopted depending on the type of the main component of the eraser, such as the elastomer-based, vinylchloride-based, or other types of resins. For example, in the case of the elastomer-based eraser, an oil component may be increased as one component of the eraser composition, or the degree of polymerization of the synthetic resin may be adjusted. Moreover, for example, in the case of the vinylchloride-based eraser composition, the gellation temperature of the eraser composition contained in the skeleton structure preferably may be set to a comparatively low temperature range, such as, 100 to 110° C., more preferably, 105 to 108° C., and most preferably, approximately 107° C. Here, the above-mentioned blocks are not particularly limited; however, it is preferable to set the diameter or the length of the side thereof to not less than 5 mm. Moreover, the shapes of the blocks may be selected from various shapes, in addition to the spherical, rectangular and plate shapes.

The erasers of the present invention, described in the various embodiments, effectively may be applied to, for example, a mechanical pencil with an eraser attached to the end thereof and an electric-type eraser with an eraser attached to an eraser holder, as well as to a feeding-type eraser having a feeding mechanism, a knocking type eraser, that is, the lead of a mechanical pencil is the eraser itself and an eraser detachably attached into a cylinder. In these cases, the eraser of the present invention is applied, particularly, as an exchange eraser (exchange rubber eraser).

The manufacturing method of the eraser of the present invention is not particularly limited. For example, a pre-cure eraser composition and a component or a structural material to form a skeleton structure are mixed with each other so that the pre-cure elastic material of the eraser composition is impregnated into the void portions of the porous structural material, and this then is cured so as to provide an eraser composition. Here, a process in which the material is put into a predetermined eraser mold may be carried out at any time in the preparation processes.

A preferable manufacturing method of an eraser is explained as follows: an eraser composition containing at least either a rubber component or a resin component is impregnated into a skeleton structure so that the eraser composition is absorbed in void portions in the skeleton structure, and the eraser composition then is cured. Moreover, another method is explained as follows: an eraser composition containing at least either a pre-cure rubber component or resin component is impregnated into a porous structural material so that the eraser composition is absorbed in void portions in the porous structural material, and the eraser composition then is cured. Here, in this method, after the eraser composition has been impregnated into the skeleton structure, that is, in particular, the porous structural material, a compressing process is preferably provided. In particular, a most preferable manufacturing method for an eraser includes the following steps: An eraser composition containing at least either a rubber component or a resin component is filled into a plate-shaped molding frame (for example, a plate-shaped molding frame with a bottom), and a porous structural material is placed into the molding frame so as to be impregnated, and this is then compressed with a heating press to provide an eraser. Here, in order to make uniform and increase the amount of impregnation of the eraser composition, the eraser composition is further impregnated into the porous structural material into which the eraser composition has been impregnated by having been placed thereon; this method is also effective. Moreover, another preferable method includes the following steps: The eraser composition containing at least either a rubber component or a resin component is added to the skeleton structure under normal pressures, and the void portions of the skeleton structure as vacuums are allowed to absorb the eraser composition. Furthermore, in another applicable method, to the skeleton structure placed under a vacuum is added an eraser composition containing at least either a rubber component or a resin component so that the void portions of the skeleton structure are filled with the eraser composition, and the eraser composition then is cured.

Additionally, an eraser composition is impregnated into a porous structural material of the skeleton structure having a size greater than a finished molded size, and this is compressed into a predetermined molded product; thus, this method is more preferable in that the pore rate and the content of the eraser composition can be adjusted even in the case when the same porous structural material is used, and in that it is possible to control the quality of the product properly.

In another applicable manufacturing method, an eraser composition preliminarily is impregnated into the void portions of a porous structural material, and this then is put into a predetermined eraser mold where it is cured by applying heat, etc. to provide the product.

With respect to the curing conditions by heat in the above-mentioned various manufacturing methods, they are preferably set in a temperature range of 100° C. to 160° C. for 10 to 50 minutes.

Here, in the case when the eraser composition is impregnated into the porous structural material of the skeleton structure, if a thermoplastic synthetic resin such as an elastomer-based resin is contained in the composition, the eraser composition sometimes comes to have a high viscosity even in a heated molten state; and in such a case, in order to improve the impregnating property, the following methods may be used: For example, in this method, after the eraser composition has been dissolved in a solvent and impregnated into the skeleton structure of the porous structural material, the solvent is evaporated. Moreover, after the eraser composition has been emulsified by a dispersant, and impregnated thereto, the dispersant may be eliminated by evaporation, etc. Furthermore, after the eraser composition has been impregnated into the skeleton structure of the porous structural material in a liquid low-molecular state, the monomer of the eraser composition may be polymerized.

Moreover, in the case of the mesh structural material, the same method as the method for processing the porous structural material containing virtually polygonal or virtually circular cells may be used, or another method may be used in which: a pre-cure eraser composition in a sol state, etc. is injected into a predetermined eraser mold, and to this is added fiber and mixed so that the elastic material of the eraser composition is contained in void portions between the fiber, and this is then cured by heat, etc. to provide the product.

Upon manufacturing the eraser of the present invention by using the above-mentioned methods, for example, an eraser composition in a sol state, which has a viscosity in the range of 100 to 20,000 mPa s (more preferably, 800 to 7,000 mPa s) under the measuring conditions of, for example, a temperature of 20° C., the application of a B-type viscometer and the rotation speed of 6 rpm, is preferably used, and in particular, a sol-state eraser composition made from a polyvinylchloride resin is more preferably used. This is because the eraser composition having a viscosity in this range exerts a preferable fluidity in normal temperatures, so as to be impregnated and absorbed into the void portions of the porous structural material of the skeleton structure, and properly is filled into the void portions of the porous structural material of the skeleton structure and easily cured. Additionally, even an eraser composition having a high viscosity exceeding 20,000 mPa s may be used and impregnated, with a reduced viscosity by heat or under a reduced pressure.

The surface hardness of the eraser of the present invention is not particularly limited; and, for example, it is set in the range of 50 to 80, and more preferably, 60 to 70. Further, the sticking strength of the eraser is not particularly limited; and, for example, it is set in the range of 1.5 to 20 (kgf), and more preferably, 2 to 5 (kgf). Here, the surface hardness is measured in conformity to JIS S 6050. Moreover, the sticking strength is measured as follows: A sample is machined into a disc shape having a thickness of 5 mm and a diameter of 10 mm, and a rod having a diameter of 4.4 mm is pressed onto the center of the disc at a speed of 7 mm/min., and a load at the time when the portion pressed by the rod has been broken is measured as the sticking strength.

In the case of the eraser of the present invention, even when the surface hardness is the same, the sticking strength can be reduced as compared with the conventional eraser. For this reason, it is superior in the strength and viscoelasticity, and even if the elastic material of the eraser composition is soft, the eraser is less susceptible to cracking with toughness, and has a good touch in use. Of course, it has a superior eraser-scrap-collecting property, and eraser scraps are properly collected on the surface of paper or on the surface of the eraser without being scattered. Moreover, it also has a superior erasing property.

As compared with conventional erasers having the same eraser composition, produced through the same manufacturing conditions (curing temperature, etc.), the eraser of the present invention has lower sticking strength. In other words, the formation of the skeleton structure makes the elastic material of the eraser composition softer even in the case of the same manufacturing conditions. Thus, although the present invention only adds the porous structural material of the skeleton structure to the conventional eraser composition without changing manufacturing conditions, it becomes possible to provide an eraser that is superior in the strength and elasticity, has a good eraser-scrap-collecting property, is superior in the touch in use and exerts a high erasing property.

The coefficient of friction of the eraser of the present invention is preferably set not more than 0.8. This is because the eraser of the present invention having a coefficient of friction not more than 0.8 has a light touch upon erasing. Moreover, the wear rate of the eraser is preferably set to not less than 1%. This is because the eraser of the present invention having a wear rate of not less than 1% is less susceptible to stain on its surface upon erasing, and can carry out an erasing process easily.

As described above, it is most preferable for the eraser of the present invention to have a surface hardness of 50 to 80, a sticking strength of 1.5 to 20 (kgf), a coefficient of friction of not more than 0.8 and a wear rate of not less than 1%.

Additionally, the eraser of the present invention is constituted by a structural body having a skeleton structure and an elastic material of an eraser composition. Therefore, the present invention includes not only an eraser in which the skeleton structure is contained in the entire elastic material of the eraser composition, but also another eraser in which the skeleton structure is contained in only one portion thereof. Moreover, as shown in FIG. 6, an eraser 1 in which an elastic material 3 is contained in only one portion of a skeleton structure 2 may be included.

EXAMPLES

Eraser Material

In the following Examples and Comparative Examples, a sol composition of polyvinylchloride having the following composition was used as an eraser material (eraser base material).

Composition of Polyvinylchloride Sol

Resin (polyvinylchloride, trade name "ZEST P21" made by SHIN DAI-ICHI VINYL CORPORATION)
: 32 parts by weight Plasticizer (dioctylphthalate, trade name "SANSOCIZER DOP" made by New Japan Chemical Co., Ltd.)
: 50 parts by weight Filler (calcium carbonate heavy, made by BIHOKU FUNKA KOGYO Co.,Ltd.)
: 17 parts by weight Stabilizer (magnesium-zinc-based material, trade name "R-23L" made by TOKYO FINE CHEMICAL Co., Ltd.)
: 1 part by weight

Example 1

Foam material (0.15 parts by weight) of a melamine-based resin was impregnated with the above-mentioned polyvinylchloride sol composition (20 parts by weight), and this then was heated at 130° C. for 20 minutes to prepare an eraser. Foam material of a melamine-based resin is manufactured by BASF AG under the tradename of Basotect.

Example 2

Foam material (0.15 parts by weight) of a urethane-based resin was impregnated with the above-mentioned polyvinylchloride sol composition (20 parts by weight), and this then was heated at 130° C. for 20 minutes to prepare an eraser.

Foam material of a urethane-based resin is manufactured by INOAC CORPORATION under the tradename of MF-50.

Example 3

Foam material (0.15 parts by weight) of an ethylene-based resin was impregnated with the above-mentioned polyvinylchloride sol composition (20 parts by weight), and this then was heated at 130° C. for 20 minutes to prepare an eraser. Foam material of an ethylene-based resin is manufactured by SANWA KAKO Co.,Ltd. under the tradename of OPCELL LC-300#3.

Example 4

Foam material (0.15 parts by weight) of a vinylchloride-based resin was impregnated with the above-mentioned polyvinylchloride sol composition (20 parts by weight), and this then was heated at 130° C. for 20 minutes to prepare an eraser.

Example 5

Foam material (0.15 parts by weight) of nitrile-butadiene rubber (NBR foam) was impregnated with the above-mentioned polyvinylchloride sol composition (20 parts by weight), and this then was heated at 130° C. for 20 minutes to prepare an eraser.

Example 6

Fiber aggregate in a felt form (0.15 parts by weight) was impregnated with the above-mentioned polyvinylchloride sol composition (20 parts by weight), and this then was heated at 130° C. for 20 minutes to prepare an eraser.

Fiber aggregate in a felt form is manufactured by TSUKASA FELT SHOJI Co.,Ltd. under the tradename of #4000.

Example 7

Foam material (0.15 parts by weight) of a melamine-based resin was impregnated with the above-mentioned polyvinylchloride sol composition (20 parts by weight), and this then was heated at 114° C. for 20 minutes to prepare an eraser. Foam material of a melamine-based resin is manufactured by BASF AG under the tradename of Basotect.

Comparative Example 1

Only the above-mentioned polyvinylchloride sol composition was used, and heated at 130° C. for 20 minutes to prepare an eraser.

(Evaluation)

With respect to the erasers related to Examples 1 to 7 and Comparative Example 1, evaluation was made on the touch in use and eraser-scrap-collecting property, based upon the following test conditions. The results of the evaluation are shown in Table 1.

TABLE 1

| | Examples | | | | | | | Comparative Example |
|---|---|---|---|---|---|---|---|---|
| | 1 | 2 | 3 | 4 | 5 | 6 | 7 | 1 |
| Touch in use | ◎ | ○ | ○ | ○ | ○ | ○ | ◎ | × |
| Eraser scrap-collecting property | ○ | ○ | ○ | ○ | ○ | ○ | ○ | × |

(Tests on Touch in Use)

Handwritings written with a pencil were erased by using the erasers related to Examples 1 to 7 and Comparative Example, and the touch in use was evaluated based on the following criteria.

[Evaluation Criteria of Touch in Use]

◎: Handwritings can be erased very smoothly with a light touch.

○: Handwritings can be erased smoothly with a light touch.

×: Handwritings cannot be erased without applying a high pressure.

(Tests on Eraser-Scrap-Collecting Property)

After the above-mentioned erasing tests, the eraser-scrap-collecting property was evaluated based upon the following criteria. Further, after the erasing process, the state of the eraser surface was observed.

[Evaluation Criteria of Eraser-Scrap-Collecting Property]

○: Eraser scraps are collected on the surface of paper or on the surface of the eraser, and after the erasing process, the surface of the eraser is white.

×: Eraser scraps are hardly collected on the surface of paper or on the surface of the eraser, and after the erasing process, black carbon from the pencil adheres to the surface of the eraser.

(Results of Evaluation)

As shown in Table 1, although the erasers of Examples 1 to 7 have high toughness, they can erase handwritings completely in a manner like sliding with a light touch. Moreover, the eraser scraps are not scattered, and collected on the surface of paper or the surface of the eraser in a continuous form. Moreover, although there is an increase in the abrasion loss of the elastic material, the pencil handwritings are sufficiently taken into the eraser scraps, and the surface of the eraser is still white. Furthermore, during the erasing process, the skeleton portion of the porous structural material is broken and it is observed that while eraser scraps are taking in the fragments of the skeleton portion, they are separated in a collected manner.

In contrast, the eraser of Comparative Example 1 cannot erase without applying a high pressure. Further, eraser scraps scatter all over, and are not collected in a continuous form. Moreover, after the erasing process, the surface of the eraser turns black with carbon from the pencil adhering thereto. Furthermore, in the case of the erasers of Examples 1 to 7, even if they are rubbed against the surface of paper with a high strength, they are not easily broken; however, the eraser of Comparative Example 1 is broken easily when rubbed against the surface of paper with a high strength, and therefore, inferior in the rupture resistant property.

Here, the composition of the elastic material of the eraser composition and the manufacturing conditions are the same between Examples 1 to 7 and Comparative Example 1. Examples 1 to 7 are only different from Comparative Example 1 in that the porous structural material is used therein.

Figure 7:
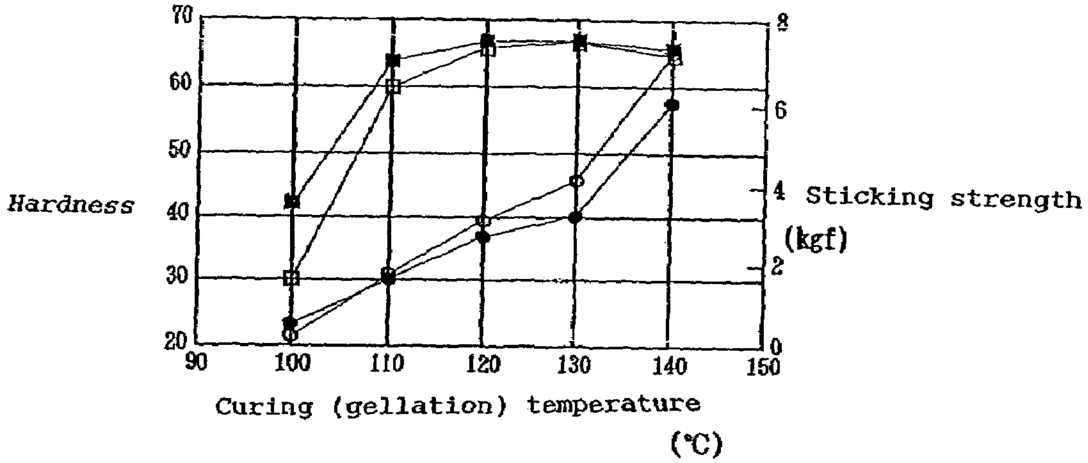
FIG. 7 is a graph that shows the relationship among the curing temperature, the surface hardness and the sticking strength.

Next, a pre-cure eraser of Example 1 using the foam material of a melamine-based resin and a pre-cure eraser of Comparative Example 1 which has no skeleton structure of the porous structural material were subjected to measurements to find the respective relationship among the curing temperature, the surface hardness and the sticking strength, and the results are shown in Table 2. FIG. 7 is a graph showing the relationship among the curing temperature, the surface hardness and the sticking strength. In Table 2, the results related to the eraser of Example 1 are described in the column of "with foam material" and those related to the eraser of Comparative Example 1 are described in the column of "without foam material". In FIG. 7, represents the sticking strength of the eraser related to Example 1; ○ represents the sticking strength of the eraser related to Comparative Example 1; ■ represents the surface hardness of the eraser related to Example 1; and □ represents the surface hardness of the eraser related to Comparative Example 1.

Here, the surface hardness was measured in conformity to JIS S 6050. Moreover, the sticking strength is measured as follows: A sample is machined into a disc shape having a thickness of 5 mm and a diameter of 10 mm, and a rod having a diameter of 4.4 mm is pressed onto the center of the disc at a speed of 7 mm/min., and a load at the time when the portion pressed by the rod has been broken is measured as the sticking strength. Here, the curing time was 20 minutes.

TABLE 2

| Curing | Hardness | | Sticking strength (kgf) | |
|---|---|---|---|---|
| temperature | With foam material | Without foam material | With foam material | Without foam material |
| 100 | 42 | 30 | 0.50 | 0.19 |
| 110 | 64 | 60 | 1.63 | 1.73 |
| 120 | 67 | 66 | 2.72 | 3.13 |
| 130 | 67 | 67 | 3.26 | 4.15 |
| 140 | 66 | 65 | 6.09 | 7.33 |

From Table 2 and FIG. 7, within a curing temperature range of 110 to 130° C., the eraser of Example 1 has a higher surface hardness and also has a lower sticking strength than the eraser of Comparative Example 1. More specifically, the eraser of Example 1 has a surface hardness of 64 to 67 and a sticking strength of 1.63 to 3.26 (kgf). This is because, even if it is cured at the same curing temperature for the same time as the eraser of Comparative Example 1, the eraser of Example 1 has a sufficient strength with toughness, and in contrast, also has a low degree of curing (degree of gelation), thereby indicating that the elastic material of the eraser composition is softer than that of Comparative Example 1. Therefore, as compared with the eraser of the conventional Comparative Example 1, since the eraser of Example 1 has a lower degree of curing and a softer elastic material, it is far superior in the erasing property, and has a good eraser-scrape-collecting property. These trends are also applicable to the erasers of above-mentioned Examples 2 to 7. Moreover, in fact, the eraser, which has a surface hardness of 64 to 67 and a sticking strength of 1.63 kgf to 3.26 (kgf), was superior in all the factors, such as the strength, touch in use, erasing property, and eraser-scrap-collecting property.

The present invention relates to an eraser which is provided with an elastic material of an eraser composition containing at least either a rubber component or a resin component, and a skeleton structure containing the elastic material, from which skeleton portions on the abrasion surface of the elastic material are disconnected and separated together with the abrasion of the elastic material when rubbed. In particular, in the eraser of the present invention, the skeleton structure is constituted by a porous structural material that is broken due to abrasion. Moreover, in the eraser of the present invention, the porous structural material of the skeleton structure is made of an organic polymer.

Therefore, as compared with the conventional eraser, the eraser of the present invention has a sufficient strength so that it is less susceptible to cracking even after repeated use, erases with a light touch so that it is superior in the touch in use, and also has a superior erasing property. Moreover, the eraser has a particularly remarkable effect in that eraser scraps are generated in a continuous collected form without being scattered.

The invention claimed is:

1. An eraser for erasing information, comprising:

a skeleton structure constituted by a skeleton portion and a void portion; and an eraser-base material filled in the void portion, wherein the skeleton portion of the skeleton structure is constituted by a porous structural material of organic polymer consisting of melamine-based resin, the skeleton portion of the skeleton structure has an average thickness from 1 μm to 100 μm, and the void portion of the skeleton structure has an average pore size of 20 μm to 3 mm, the eraser base material is selected from the group consisting of (a) a plastic-based eraser composition, (b) a rubber-based eraser composition, and (c) an elastomer-based eraser composition, and (a) the plastic-based eraser composition comprises at least one of a vinylchloride resin and a vinylacetate resin, and comprises a filler, (b) the rubber-based eraser composition comprises a rubber component, factice, sulfur, a vulcanizing accelerator, and a filler, (c) the elastomer-based eraser composition comprises a thermoplastic elastomer and a filler.

2. The eraser of claim 1, wherein a filling rate of the eraser base material is set in the range of less than 100% with respect to the entire volume of the void portion in the porous structural material.

3. The eraser of claim 1, wherein a filling rate of the eraser base material is set in the range from 60% to 80% with respect to the entire volume of the void portion in the porous structural material.

4. The eraser of claim 1, wherein the skeleton portion of the skeleton structure has an average thickness of 10 μm to 50 μm, the void portion of the skeleton structure has an average pore size of 10 μm to 3 mm.

5. The eraser of claim 1, further comprising a surface hardness of 50 to 80 as measured according to JIS S6050, a sticking strength of 1.5 to 20 kgf, a coefficient of friction of not more than 0.8 and a wear rate of not less than 1%.

6. The eraser of claim 1, wherein the skeleton structure is continuous.

7. The eraser of claim 1, wherein the eraser base material has a filling rate in a range from not less than 50% to less than 100% with respect to an entire volume of the void portion of the porous structural material.

8. The eraser of claim 1, wherein the porous structural material contains a cross-sectional shape with virtually polygonal or virtually circular cells.

9. The eraser of claim 1, wherein the porous structural material is a foamed structural material.

10. The eraser of claim 1, wherein the porous structural material is a mesh structural material.

11. The eraser of claim 1, wherein the porous structural material is a stereoscopic mesh structural material.

12. The eraser of claim 1, wherein the porous structural material has a tensile strength of not more than 3 $kgf/cm^2$.

13. The eraser of claim 1, wherein the porous structural material has an extension percentage of not more than 500%.

14. The eraser of claim 1, wherein the porous structural material has a compression repulsive force of not less than 0.2 kgf.

15. The eraser of claim 1, wherein the porous structural material has a tensile strength of not more than 3 $kgf/cm^2$, an extension percentage of not less than 500%, and a compression repulsive force of not less than 0.2 kgf.

16. The eraser of claim 1, wherein at least one of the porous structural material and the eraser base material is colored.

17. The eraser of claim 1, wherein the skeleton structure is constituted by a plurality of blocks of porous structural materials.

18. The eraser of claim 17, wherein the blocks have at least one shape selected from the group consisting of spherical, polygonal, and plate shapes.

19. The eraser of claim 1, further comprising an exchanging-use eraser of a type selected from the group consisting of a feeding-type eraser, a knocking-type eraser, an eraser attached to an end of a mechanical pencil, and an electric-type eraser.

20. The eraser of claim 1, wherein the plastic-based eraser composition comprises a cured material of a sol-state composition by the vinylchloride resin and a plasticizer.

21. The eraser of claim 1, wherein the filler is at least one chemical compound selected from the group of calcium carbonate, magnesium carbonate, silica, talc, clay, diatomaceous earth, quartz powder, alumina, alumina silicate, and mica.

22. The eraser of claim 1, wherein the porous structural material of the skeleton portion is susceptible to breaking when rubbed.

23. The eraser of claim 1, further comprising a void rate of the skeleton structure is not less than 90%.

24. An electric-eraser comprising:

an eraser holder; and an eraser for erasing information, the eraser being attached to the holder, the eraser comprising:

a skeleton structure constituted by a skeleton portion and a void portion; and an eraser-base material filled in the void portion, wherein the skeleton portion of the skeleton structure is constituted by a porous structural material of organic polymer consisting of melamine-based resin, the skeleton portion of the skeleton structure has an average thickness from 1 μm to 100 μm, and the void portion of the skeleton structure has an average pore size of 20 μm to 3 mm, the eraser base material is selected from the group consisting of (a) a plastic-based eraser composition, (b) a rubber-based eraser composition, and (c) an elastomer-based eraser composition, and (a) the plastic-based eraser composition comprises at least one of a vinylchloride resin and a vinylacetate resin, and comprises a filler, (b) the rubber-based eraser composition comprises a rubber component, factice, sulfur, a vulcanizing accelerator, and a filler, (c) the elastomer-based eraser composition comprises a thermoplastic elastomer and a filler.

25. The electric-eraser of claim 24, wherein the filler is at least one chemical compound selected from the group of calcium carbonate, magnesium carbonate, silica, talc, clay, diatomaceous earth, quartz powder, alumina, alumina silicate, and mica.

26. The electric-eraser of claim 24, wherein at least one of the porous structural material and the elastic material is colored.

27. The electric-eraser of claim 24, wherein the skeleton structure is constituted by a plurality of blocks of porous structural materials.

28. The electric-eraser of claim 24, wherein the skeleton structure is constituted by a plurality of blocks of porous structural materials, and the blocks have at least one shape selected from the group consisting of spherical, polygonal, and plate shapes.

* * * * *